US012697588B2

(12) United States Patent
Hong et al.

(10) Patent No.: US 12,697,588 B2
(45) Date of Patent: Aug. 4, 2026

(54) FLOW-ELECTRODE CARTRIDGE UNIT AND SUBMERGED FLOW-ELECTRODE CAPACITIVE DEIONIZATION DEVICE USING SAME

(71) Applicant: Korea University Research and Business Foundation, Seoul (KR)

(72) Inventors: Seung-Kwan Hong, Yongin-si (KR); Ji-Hun Lim, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 726 days.

(21) Appl. No.: 18/075,751

(22) Filed: Dec. 6, 2022

(65) Prior Publication Data

US 2023/0201773 A1 Jun. 29, 2023

(30) Foreign Application Priority Data

Dec. 23, 2021 (KR) ........................ 10-2021-0186148

(51) Int. Cl.
*B01D 61/42* (2006.01)
*C02F 1/469* (2023.01)

(52) U.S. Cl.
CPC .......... *B01D 61/428* (2022.08); *C02F 1/4691* (2013.01); *B01D 2313/243* (2013.01); *B01D 2313/26* (2013.01); *B01D 2313/345* (2013.01); *B01D 2313/44* (2013.01)

(58) Field of Classification Search
None
See application file for complete search history.

(56) References Cited

U.S. PATENT DOCUMENTS

2005/0263457 A1 * 12/2005 Wilkins .................. C02F 1/283
210/748.11

OTHER PUBLICATIONS

Cho et al ("A novel three-dimensional desalination system utilizing honeycomb-shaped lattice structures for flow-electrode capacitive deionization", Energy Environ. Sci., 2017, 10, 1746-1750). (Year: 2017).*

* cited by examiner

*Primary Examiner* — Alexander W Keeling
(74) *Attorney, Agent, or Firm* — NSIP Law

(57) ABSTRACT

A flow-electrode cartridge unit and a submerged flow-electrode capacitive deionization device using the same are proposed. The flow-electrode cartridge unit includes a pair of porous current collector plates arranged to face each other in a spaced apart state from each other in a first direction, a pair of ion separation membranes positioned on respective outer surfaces of the porous current collector plates in the first direction, a channel frame for wrapping around the pair of porous current collector plates and the pair of ion separation membranes to expose each of the ion separation membranes in the first direction, thereby forming a flow electrode channel between the pair of porous current collector plates, a pair of communication holes formed in the channel frame and communicating the flow electrode channel to an outside, and an electrode terminal formed in the channel frame and electrically connected to the porous current collector plates.

4 Claims, 5 Drawing Sheets

Water 150 150 150 150 150

FIG. 5

FLOW-ELECTRODE CARTRIDGE UNIT AND SUBMERGED FLOW-ELECTRODE CAPACITIVE DEIONIZATION DEVICE USING SAME

CROSS REFERENCE TO RELATED APPLICATION

The present application claims priority to Korean Patent Application No. 10-2021-0186148, filed Dec. 23, 2021, the entire contents of which is incorporated herein for all purposes by this reference.

BACKGROUND OF THE INVENTION

Field of the Invention

The present disclosure relates to a flow-electrode cartridge unit and a submerged flow-electrode capacitive deionization device using the same and, more particularly, to a flow-electrode cartridge unit and a submerged flow-electrode capacitive deionization device using the same, the unit and device being applied to water treatment using flow-electrode capacitive deionization.

Description of the Related Art

Recently, countries around the world are making efforts to develop clean alternative energy in order to solve the problems of air pollution and global warming. In particular, currently, offshore power generation using a difference in electrolyte concentration is emerging as a new topic.

Along with clean alternative energy, the development of large-capacity power storage technology, enabling storage of electric energy generated through various alternative energies, is emerging as the foundation future green industry. Most of such future power storage technologies are based on a Li-ion battery method or the same method as that of supercapacitors using the principle of ion adsorption (i.e., charging) and ion desorption (i.e., discharging), and the countries around the world are making a lot of research and development efforts for realizing a high-efficiency, compactness, and large-capacity power storage through improvement of the charging and discharging characteristics of material parts.

Meanwhile, recently, a process capable of water treatment with very low energy cost compared to that of the existing evaporation method or reverse osmosis (RO) method, that is, a process of a capacitive deionization (CDI), is in progress by using the same principle in water treatment fields such as water purification or wastewater treatment and seawater desalination in preparation for water pollution and water shortage.

In a power storage and water treatment system using the same principle, the biggest problem is efficiency decrease and an expensive device cost when large-capacity is introduced. In other words, stacking of a plurality of unit cells is required due to introducing a large electrode area for scale-up and consequent non-uniformity of electric field distribution within electrodes, a limited amount of active material of a thin film electrode coated on a current collector, a reduced contact area between the active material and electrolyte and reduced charging/discharging efficiency caused by a binder in a coating process, and others. Accordingly, a high device cost, in particular, an operating cost increase due to pressure loss of a water (i.e., an electrolyte) flow in a stack in a capacitive deionization (CDI) process is pointed out as a problem.

Recently, a new GDI approach called as flow-electrode capacitive deionization (FCDI) has been proposed. As an example, Korean Patent Nos. 10-1233295 and 10-1318331 are exemplified.

In the case of a flow-electrode capacitive deionization technology, a design for introducing larger capacity such as increase of an electrode area and the like is required, so the development is required for the flow-electrode capacitive deionization technology capable of increasing electrode capacity while reducing an installation space, maximally increasing contact areas between the flow electrode and influent water, and simplifying a structure.

SUMMARY OF THE INVENTION

Accordingly, the present disclosure has been devised to solve the above problems, and an objective of the present disclosure is to provide a flow-electrode capacitive deionization technology capable of increasing an electrode capacity while reducing an installation space, maximally increasing contact areas between the flow electrode and influent water, and simplifying a structure.

In addition, another objective of the present disclosure is to provide a flow-electrode cartridge unit and a submerged flow-electrode capacitive deionization device using the same, wherein replacement and management of an anode unit or a cathode unit is convenient in implementing the flow-electrode capacitive deionization.

According to the present disclosure, the above objectives are achieved by a flow-electrode cartridge unit including: a pair of porous current collector plates arranged to face each other in a spaced apart state from each other in a first direction; a pair of ion separation membranes positioned on respective outer surfaces of the porous current collector plates in the first direction; a channel frame configured to wrap around the pair of porous current collector plates and the pair of ion separation membranes, so as to expose each of the ion separation membranes in the first direction, thereby forming a flow electrode channel between the pair of porous current collector plates; a pair of communication holes formed in the channel frame and configured to communicate the flow electrode channel to an outside; and an electrode terminal formed in the channel frame and electrically connected to the porous current collector plates.

Here, the pair of communication holes may be respectively formed in both edge regions of one side surface of the channel frame in the first direction.

In addition, the electrode terminal may be formed in the channel frame relatively adjacent to any one side of the pair of communication holes.

In addition, positions of the pair of communication holes and the electrode terminal on the channel frame may be standardized.

Meanwhile, according to another exemplary embodiment of the present disclosure, the above objective are also achieved by a submerged flow-electrode capacitive deionization device including: a cartridge array unit provided with a plurality of flow-electrode cartridge units arranged in a spaced apart state to face each other along a first direction; an inlet pipe connected in parallel to any one of a pair of communication holes constituting each of the flow-electrode cartridge units, thereby introducing an electrode solution into a flow electrode channel of each of the flow electrode cartridge units; an outlet pipe connected in parallel to the other one of the pair of the communication holes, thereby discharging the electrode solution introduced to flow into the flow electrode channel to an outside of the flow electrode channel; and a cathode line and an anode line alternately connected in parallel to each electrode terminal of the plurality of flow-electrode cartridge units so that the plurality of flow-electrode cartridge units alternately forms anodes and cathodes in the first direction.

Here, the plurality of flow-electrode cartridge units may be arranged such that the pair of communication holes are arranged along the first direction, so that the inlet pipe and the outlet pipe face each other in a state of extending along the first direction.

In addition, the plurality of flow-electrode cartridge units may be arranged such that the electrode terminals are positioned in a zigzag form along the first direction, so that the cathode line and the anode line face each other in a state of extending along the first direction.

In addition, the submerged flow-electrode capacitive deionization device may further include a raw water flow generation unit configured to induce a flow of raw water between the flow-electrode cartridge units for each pair adjacent to each other.

Here, the raw water flow generation unit may include a flow rotor configured to rotate between the flow-electrode cartridge units for each pair, so that the flow of the raw water is induced between the flow-electrode cartridge units for each pair adjacent to each other.

Alternately, the raw water flow generation unit may include an air aeration unit configured to spray air bubbles between the flow-electrode cartridge units, so that the flow of the raw water is induced between the flow-electrode cartridge units for each pair adjacent to each other.

According to the present disclosure in a manner conforming with the above-described configuration, there is provided an effect of increasing the treatment capacity by performing the water treatment process by immersing each cartridge array unit in a water tank through which the influent water, which is required to remove ions, flows.

In addition, each of flow-electrode cartridge units constituting the cartridge array unit is configured in a form of a cartridge-type module, so as to be immersed in the influent water to maximally increase the contact area with the influent water, whereby process performance may be improved.

In addition, another effect of reducing the installation space while contributing to realizing of a larger area may also be achievable by manufacturing each flow-electrode cartridge unit in a form of a large area cartridge unit.

In addition, there is provided a yet another effect suitable for installation and maintenance due to easy individual management by modularizing the flow-electrode cartridge units without distinction of the anode and the cathode.

BRIEF DESCRIPTION OF THE DRAWINGS

FIG. 1 is a view illustrating a configuration of a submerged flow-electrode capacitive deionization device according to an exemplary embodiment of the present disclosure.

FIGS. 4 and 5 are views respectively illustrating configurations of submerged flow-electrode capacitive deionization devices according to another exemplary embodiment of the present disclosure.

DETAILED DESCRIPTION OF THE INVENTION

Figure 2:
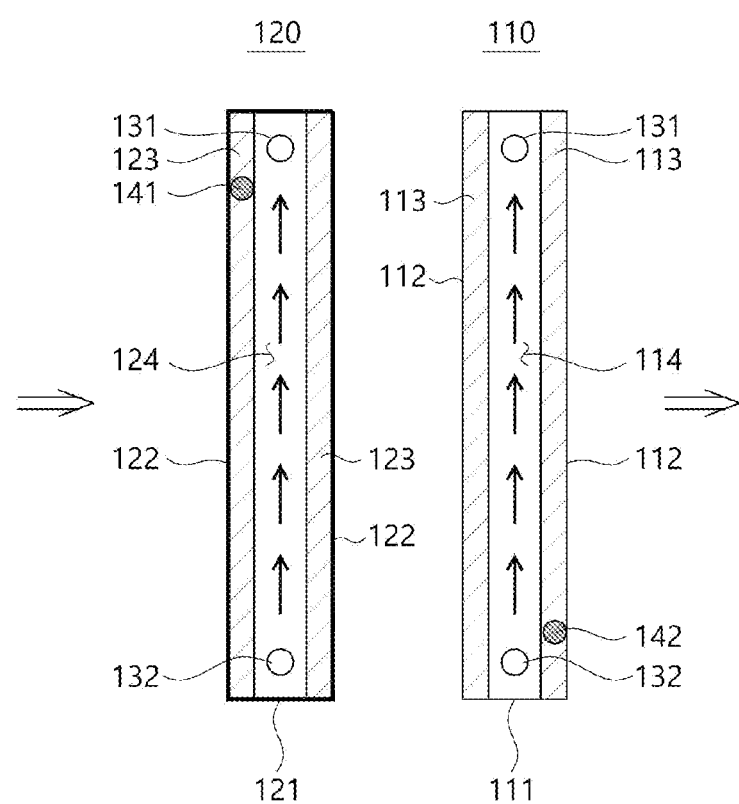
FIG. 2 is a view illustrating a cross section taken along line A-A of FIG. 1.

Advantages and features of the present disclosure and the methods of achieving the same will become apparent with reference to an exemplary embodiment described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

Hereinafter, with reference to the accompanying drawings, the exemplary embodiments according to the present disclosure will be described in detail.

Figure 1:
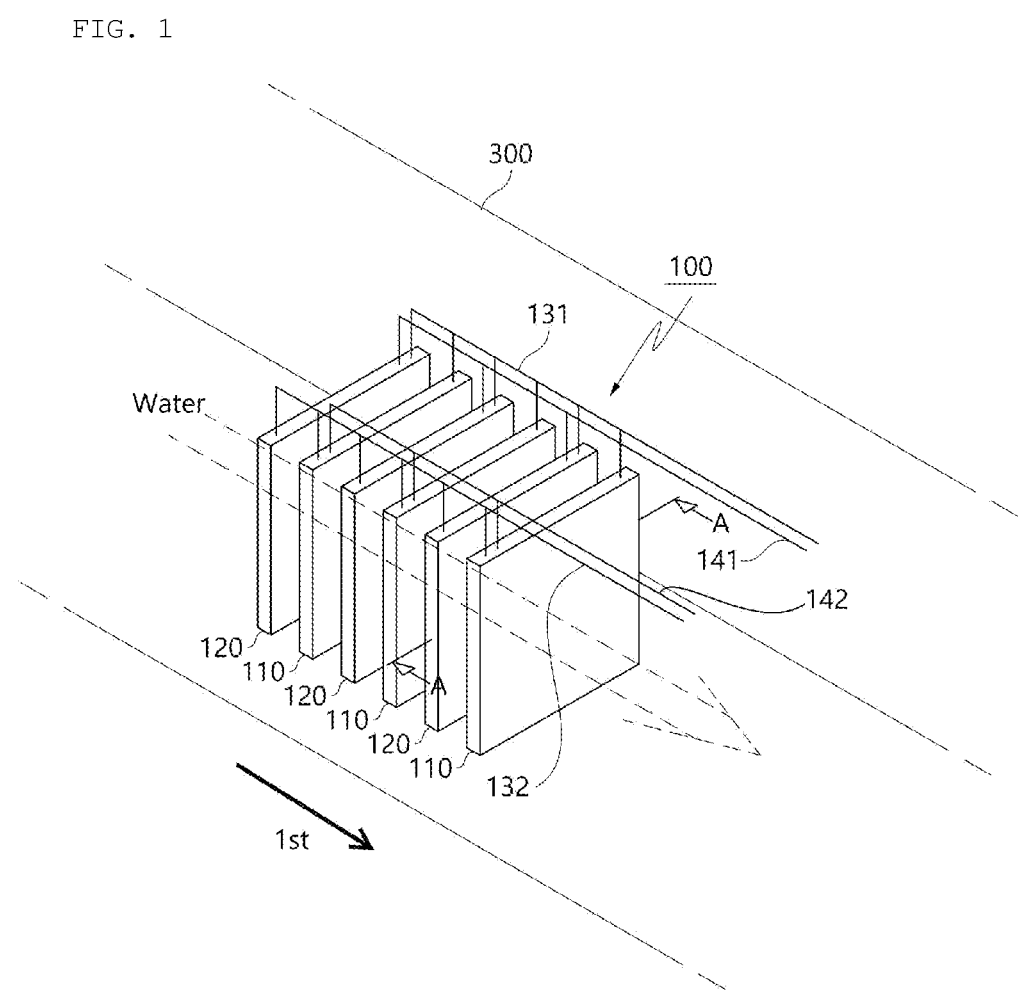

FIG. 1 is a view illustrating a configuration of a submerged flow-electrode capacitive deionization device 100 according to the exemplary embodiment of the present disclosure, and FIG. 2 is a view illustrating a cross section taken along line A-A of FIG. 1.

Referring to and describing FIGS. 1 and 2, the submerged flow-electrode capacitive deionization device 100 according to the exemplary embodiment of the present disclosure may be configured to include a cartridge array unit, an inlet pipe 132, an outlet pipe 131, a cathode line 142, and an anode line 141.

According to the exemplary embodiment of the present disclosure, the cartridge array unit in a state of being immersed in a storage tank 300 through which influent water flows treats the influent water through a capacitive deionization (CDI) process.

As shown in FIG. 1, the cartridge array unit according to the exemplary embodiment of the present disclosure includes a plurality of flow-electrode cartridge units 110 and 120, which are arranged in a spaced apart state to face each other along a first direction in which the influent water flows.

Figure 3:
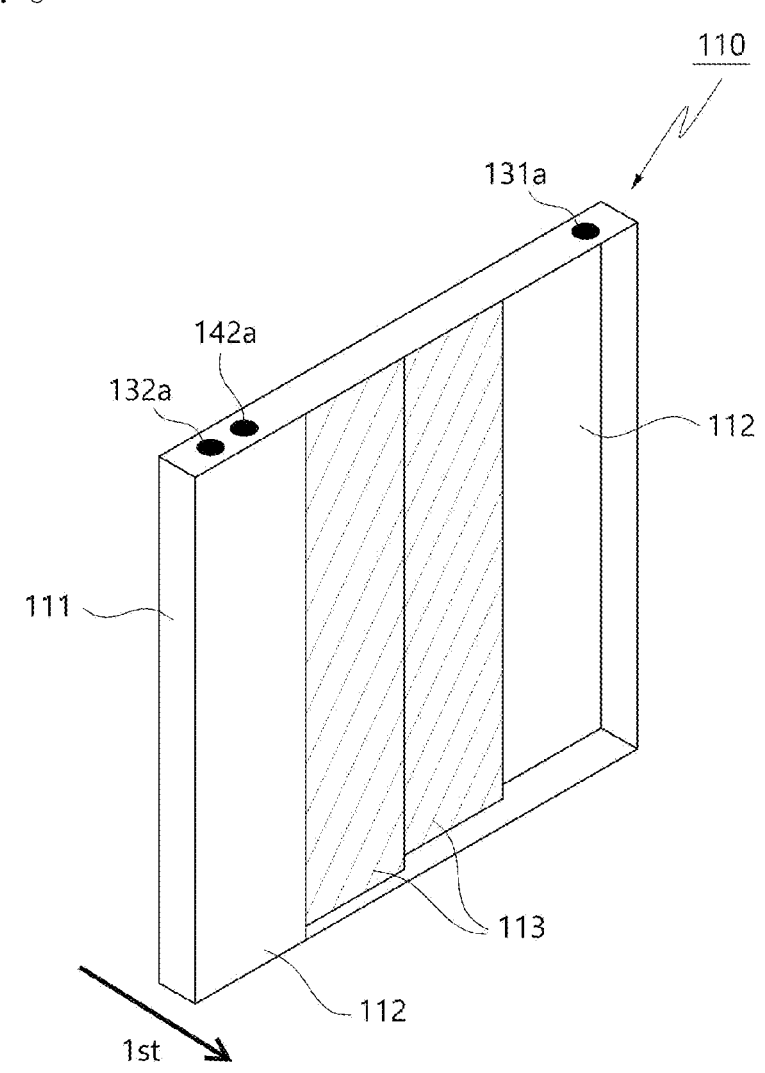
FIG. 3 is a view illustrating flow-electrode cartridge units according to the exemplary embodiment of the present disclosure.

The flow-electrode cartridge units 110 and 120 according to the exemplary embodiment of the present disclosure are configured in a form of a cartridge, and are provided to be usable for both negative electrodes and positive electrodes in common. FIG. 3 is a view illustrating flow-electrode cartridge units 110 and 120 according to the exemplary embodiment of the present disclosure.

Referring to and describing FIG. 3, the flow-electrode cartridge units 110 and 120 according to the exemplary embodiment of the present disclosure respectively include a pair of porous current collector plates 113 and 123, a pair of ion separation membranes 112 and 122, and channel frames 111 and 121, a pair of communication holes 131a and 132a, and electrode terminals 142a.

The pair of porous current collector plates 113 and 123 are arranged in a spaced apart state from each other, so as to face each other in the first direction, that is, in a flow direction of influent water. Here, each of the porous current collector plates 113 and 123 has a conductive porous structure, and may be made of, for example, carbon, a metal material, a conductive polymer, or the like.

The pair of ion separation membranes 112 and 122 are respectively positioned on outer surfaces of the porous current collector plates 113 and 123 in the first direction. Here, each of the ion separation membranes 112 and 122 may be composed of a dense membrane that blocks passing of an electrode solution to be described later, and selectively allows either positive ions or negative ions to pass only. For example, in each of the ion separation membranes 112 and 122, a membrane structure, having various types capable of selectively separating ions, such as ion exchange membranes 112 and 122 and nanofiltration membranes may be applicable. Hereinafter, an example in which the ion exchange membranes 112 and 122 are applied as the ion separation membranes 112 and 122 will be described.

The channel frames 111 and 121 according to the exemplary embodiment of the present disclosure respectively wrap around and support the pair of porous current collector plates 113 and 123 and the pair of ion exchange membranes 112 and 122 so that the ion exchange membranes 112 and 122 are respectively exposed to both sides in the first direction. In the present disclosure, as an example, a state of being exposed on the both sides, the pair of ion exchange membranes 112 and 122 wrap around and support their respective four boundaries of the ion exchange membranes 112 and 122 and the porous current collector plates 113 and 123.

As such, the Ion exchange membranes 112 and 122, porous current collector plates 113 and 123, porous current collector plates 113 and 123, and ion exchange membranes 112 and 122 are sequentially arranged in the first direction, and the channel frames 111 and 121 wrap around their respective four boundaries in a state where the pair of porous current collector plates 113 and 123 are spaced apart from each other in the first direction, so that a flow electrode channel (see FIG. 2) for an electrode solution to flow is formed in a separation space between the pair of porous current collector plates 113 and 123.

Meanwhile, the pair of communication holes 131a and 132a are formed on any one side of the four boundaries of each of the channel frames 111 and 121, so as to communicate the flow electrode channel to the outside. In the exemplary embodiment of the present disclosure, the pair of communication holes 131a and 132a are formed on one side surface, i.e., on opposite edges of any one boundary among the four boundaries, of each of the channel frames 111 and 121 in the first direction.

The electrode terminals 142a according to the exemplary embodiment of the present disclosure are formed in their respective channel frames 111 and 121, so as to be relatively adjacent to either side of the pair of communication holes 131a and 132a. Here, the positions of the pair of communication holes 131a and 132a and the electrode terminal 142a on each of the channel frames 111 and 121 may be standardized.

Through the standardization of such positions, the flow-electrode cartridge units 110 and 120 according to the exemplary embodiment of the present disclosure may be applicable to both of the cathodes and the anodes in the submerged flow-electrode capacitive deionization device 100.

More specifically, as shown in FIG. 3, the flow-electrode cartridge units 110 and 120 according to the exemplary embodiment of the present disclosure are configured symmetrically in the first direction, so in FIG. 3, even though front and rear positions are reversed relative to the up-down direction, the structures of the pair of porous current collectors 113 and 123 and the pair of ion exchange membranes 112 and 122 will be the same.

In addition, the pair of communication holes 131a and 132a may also be formed at the same positions.

However, only the position of the electrode terminal 142a is changed, so an anode and a cathode may be distinguished on the basis of the position of the electrode terminal 142a, and this description will be described later.

As shown in FIGS. 1 and 2, the flow-electrode cartridge units 110 and 120 having the above-described configuration are arranged in a spaced apart state from each other in the first direction, so as to form the cartridge array unit. In this case, the directions of the flow-electrode cartridge units 110 and 120 are alternately changed and arranged, so that the electrode terminals 142a of their respective flow-electrode cartridge units 110 and 120 are alternately arranged in a zigzag form along the first direction.

Through such an arrangement, in the plurality of flow-electrode cartridge units 110 and 120, each pair of communication holes may be arranged in a row to face each other in the first direction, and the electrode terminals 142a are able to be arranged in the zigzag form.

Here, the inlet pipe 132 connects in parallel the communication holes each located on one side of the pair of communication holes 131a and 132a, which constitute each flow electrode cartridge unit. In addition, the outlet pipe 131 connects in parallel the communication holes each located on the other side of the pair of communication holes 131a and 132a.

Through this way, as shown in FIG. 1, the inlet pipe 132 extending in the first direction is connected in parallel to each of one communication hole among the communication holes 131a and 132a, which are positioned along the first direction, so that all of the plurality of flow-electrode cartridge units 110 and 120 is able to be connected to each other through one inlet pipe 132.

Similarly, the outlet pipe 131 extending in the first direction is connected in parallel to each of the other communication hole among the communication holes 131a and 132a, which are positioned along the first direction, so that all of the plurality of flow-electrode cartridge units 110 and 120 is able to be connected to each other through one outlet pipe 131.

Accordingly, when the electrode solution is allowed to flow through one inlet pipe 132, the electrode solution is introduced through one of the communication holes 131a and 132a on each of the flow-electrode cartridge units 110 and 120, thereby flowing in each flow electrode channel.

In addition, the electrode solution flowing into the flow electrode channels is able to be discharged to the outlet pipe 131 through the other one of the communication holes 131a and 132a on each of the flow-electrode cartridge units 110 and 120.

Meanwhile, the cathode line 142 and the anode line 141 are alternately connected in parallel to each of the electrode terminals 142a of the flow-electrode cartridge units 110 and 120, so that the flow-electrode cartridge units 110 and 120 form the anodes and the cathodes alternately in the first direction.

As described above, the plurality of flow-electrode cartridge units 110 and 120 is alternately arranged with their directions switched, so that the electrode terminals 142a are positioned in the zigzag form in the first direction.

Here, the electrode terminals 142a adjacent to the inlet pipe 132 are positioned alternately, and similarly, the electrode terminals 142a adjacent to the outlet pipe 131 are also positioned alternately.

Accordingly, as shown in FIG. 1, when being extended in the first direction, the cathode line 142 is able to be alternately connected to the electrode terminals 142a of the plurality of flow-electrode cartridge units 110 and 120. Similarly, when being extended in the first direction, the anode line 141 is able to be alternately connected to the electrode terminals 142a of the plurality of flow-electrode cartridge units 110 and 120. That is, the cathode line 142 and the anode line 141 extend while facing each other in the first direction in the same manner as the inlet pipe 132 and the outlet pipe 131.

According to the present disclosure in the manner conforming with the above-described configuration, there is provided the effect of increasing the treatment capacity by performing the water treatment process by immersing each cartridge array unit in the water tank 300 through which the influent water, which is required to remove the ions, flows.

In addition, each of the flow-electrode cartridge units 110 and 120 constituting the cartridge array unit is configured in the form of the cartridge-type module, so as to be immersed in the influent water to maximally increase the contact areas with the influent water, whereby the process performance may be improved.

In addition, the effect of reducing the installation space while contributing to the realizing of the larger area may also be achievable by manufacturing each flow-electrode cartridge unit in the form of the large area cartridge unit.

In addition, there is provided the effect suitable for the installation and maintenance due to the easy individual management by way of modularizing the flow-electrode cartridge units 110 and 120 without distinction of the anode and the cathode.

Figure 4:
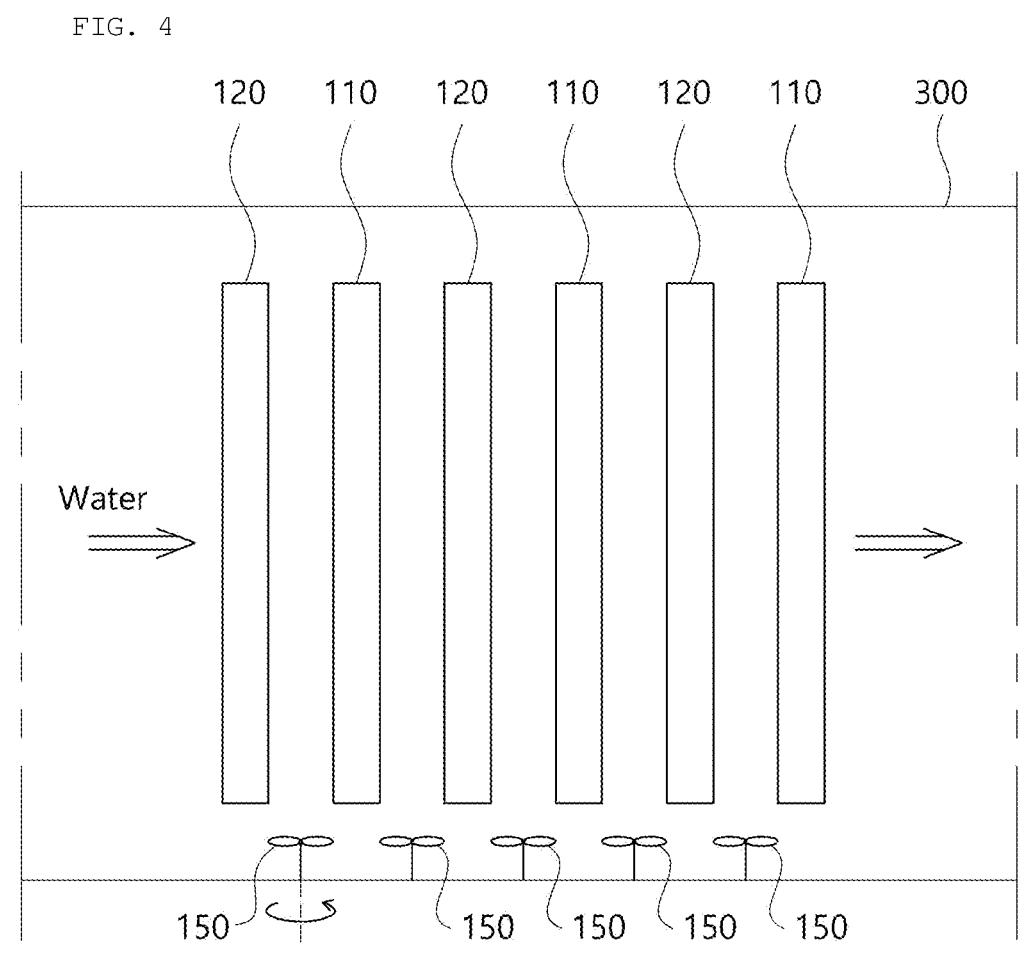
Figure 5:
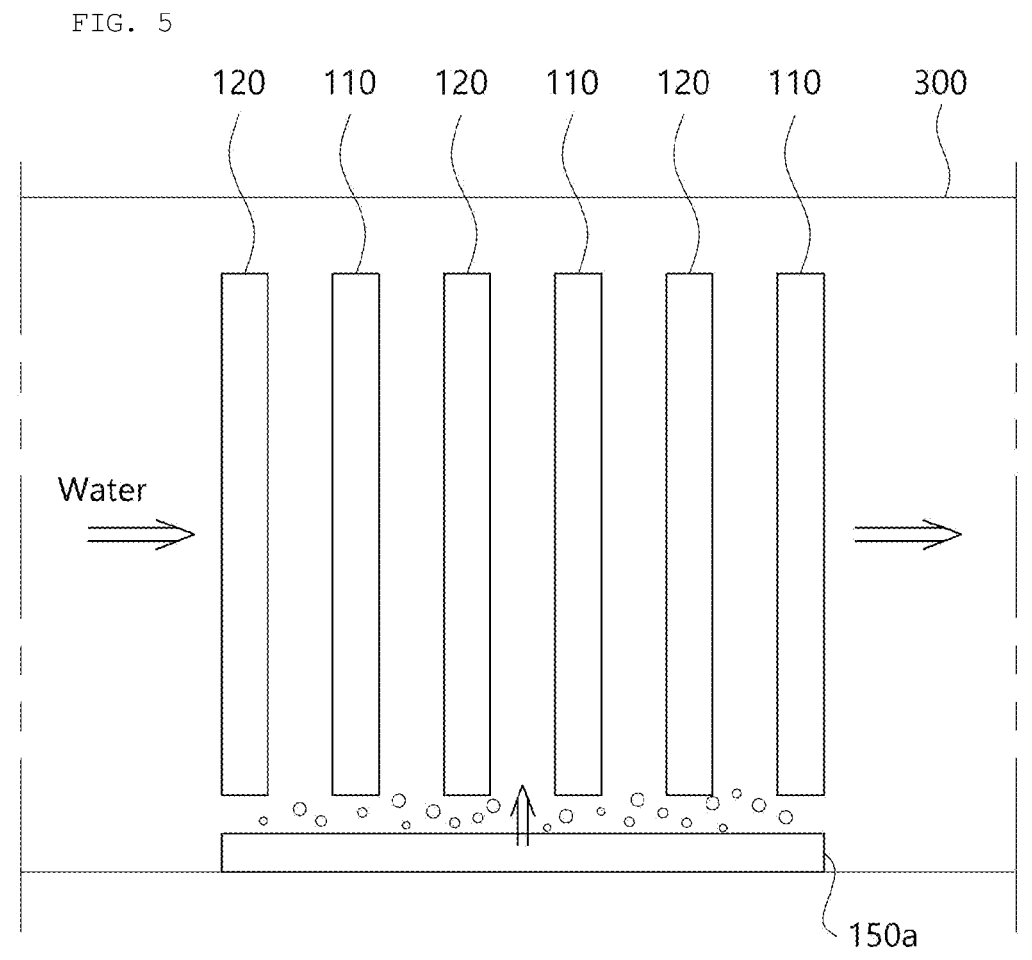

Meanwhile, as shown in FIGS. 4 and 5, the submerged flow-electrode capacitive deionization device 100 according to another exemplary embodiment of the present disclosure may be configured to further include raw water flow generation units 150 and 150a.

The raw water flow generation units 150 and 150a according to another exemplary embodiment of the present disclosure induce the flow of raw water between adjacent flow-electrode cartridge units for each pair.

That is, in the flow-electrode capacitive deionization process, the raw water containing an ionic material should be in contact with the flow-electrode cartridge units 110 and 120 performing an ion adsorption function, and accordingly, in the exemplary embodiment of the present disclosure, the raw water flow generation units 150 and 150a increase the flow-electrode capacitive deionization efficiency by allowing the raw water to flow toward the flow-electrode cartridge units 110 and 120.

In another exemplary embodiment shown in FIG. 4, each of the raw water flow generating units 150 and 150a is exemplified as a flow rotor 150 such as an impeller that rotates to induce the flow of a fluid.

That is, the flow rotor rotates between the adjacent flow-electrode cartridge units 110 and 120, which are provided in each pair thereof, so that the flow of raw water is induced between the flow-electrode cartridge units for each pair adjacent to each other.

As another example, as shown in FIG. 5, the raw water flow generation units 150 and 150a may include an air aeration unit 150a.

The air aeration unit 150a according to the exemplary embodiment of the present disclosure injects air bubbles in between the flow-electrode cartridge units 110 and 120, so that the flow of raw water is induced in between the flow-electrode cartridge units for each pair adjacent to each other.

Although some exemplary embodiments of the present disclosure have been illustrated and described, it will be understood that those skilled in the art to which the present disclosure pertains may modify the present exemplary embodiment without departing from the principles or spirit of the present disclosure. The scope of the disclosure will be defined by the appended claims and their equivalents.

What is claimed is:

1. A submerged flow-electrode capacitive deionization device comprising:

a cartridge array unit provided with a plurality of flow-electrode cartridge units and arranged in a spaced apart state to face each other along a first direction;

an inlet pipe connected in parallel to any one of a pair of communication holes constituting each of the flow-electrode cartridge units, thereby introducing an electrode solution into a flow electrode channel of each of the flow electrode cartridge units;

an outlet pipe connected in parallel to the other one of the pair of the communication holes, thereby discharging the electrode solution introduced to flow into the flow electrode channel to an outside of the flow electrode channel;

a cathode line and an anode line alternately connected in parallel to each electrode terminal of the plurality of flow-electrode cartridge units so that the plurality of flow-electrode cartridge units alternately forms anodes and cathodes in the first direction; and a raw water flow generation unit configured to induce a flow of raw water between the flow-electrode cartridge units for each pair adjacent to each other, wherein the flow-electrode cartridge unit comprises:

a pair of porous current collector plates arranged to face each other in a spaced apart state from each other in a first direction;

a pair of ion separation membranes positioned on respective outer surfaces of the porous current collector plates in the first direction:

a channel frame configured to wrap around the pair of porous current collector plates and the pair of ion separation membranes, so as to expose each of the ion separation membranes in the first direction, thereby forming a flow electrode channel between the pair of porous current collector plates;

a pair of communication holes formed in the channel frame and configured to communicate the flow electrode channel to an outside; and an electrode terminal formed in the channel frame and electrically connected to the porous current collector plates, and wherein the raw water flow generation unit comprises:

an air aeration unit configured to spray air bubbles between the flow-electrode cartridge units, so that the flow of the raw water is induced between the flow-electrode cartridge units for each pair adjacent to each other.

2. The submerged flow-electrode capacitive deionization device of claim 1, wherein the plurality of flow-electrode cartridge units is arranged such that the pair of communication holes are arranged along the first direction, so that the inlet pipe and the outlet pipe face each other in a state of extending along the first direction.

3. The submerged flow-electrode capacitive deionization device of claim 1, wherein the plurality of flow-electrode cartridge units is arranged such that the electrode terminals are positioned in a zigzag form along the first direction, so that the cathode line and the anode line face each other in a state of extending along the first direction.

4. The submerged flow-electrode capacitive deionization device of claim 1, wherein the raw water flow generation unit comprises:

a flow rotor configured to rotate between the flow-electrode cartridge units for each pair, so that the flow of the raw water is induced between the flow-electrode cartridge units for each pair adjacent to each other.

<div align="center">* * * * *</div>